(12) United States Patent
Klatt et al.

(10) Patent No.: US 12,064,913 B2
(45) Date of Patent: Aug. 20, 2024

(54) GRIPPER SYSTEM COMPRISING A GRIPPER MODULE CARRIER AND A GRIPPER MODULE FOR HOLDING WORKPIECES

(71) Applicant: KHS GmbH, Dortmund (DE)

(72) Inventors: Dieter Klatt, Hamburg (DE); Dirk Schumacher, Hamburg (DE)

(73) Assignee: KMS GmbH, Dortmund (DE)

(*) Notice: Subject to any disclaimer, the term of this patent is extended or adjusted under 35 U.S.C. 154(b) by 40 days.

(21) Appl. No.: 17/618,583

(22) PCT Filed: Oct. 20, 2020

(86) PCT No.: PCT/EP2020/079448
§ 371 (c)(1),
(2) Date: Dec. 13, 2021

(87) PCT Pub. No.: WO2021/078713
PCT Pub. Date: Apr. 29, 2021

(65) Prior Publication Data
US 2022/0258404 A1    Aug. 18, 2022

(30) Foreign Application Priority Data

Oct. 19, 2019  (DE) .......................... 102019128335.3

(51) Int. Cl.
*B29C 49/42*        (2006.01)
*B29L 31/00*        (2006.01)
(Continued)

(52) U.S. Cl.
CPC .. *B29C 49/42075* (2022.05); *B29C 49/42087* (2022.05); *B65G 47/847* (2013.01);
(Continued)

(58) Field of Classification Search
CPC ........ B29C 49/42075; B29C 49/42087; B29C 49/42073; B29C 49/42095;
(Continued)

(56) References Cited

U.S. PATENT DOCUMENTS 5,711,411 A * 1/1998 Zurweller ............... B67C 3/242
                                                            198/470.1
2009/0057099 A1* 3/2009 Preti ....................... B65G 29/00
                                                            198/459.2
(Continued)

FOREIGN PATENT DOCUMENTS

DE           8715816.7 U      1/1988
DE      102008055620 A1      5/2010
(Continued)

*Primary Examiner* — Gene O Crawford
*Assistant Examiner* — Abby A Jorgensen
(74) *Attorney, Agent, or Firm* — Hinckley, Allen & Snyder; Stephen Holmes

(57) ABSTRACT

A gripper system includes a gripper module carrier and a gripper module for holding containers or container preforms, the gripper module having a gripper base and two gripper arms with gripping elements for at least partially gripping around a holding region of containers or container preforms, the gripper arms being mounted on the gripper base such that they can pivot relative to one another, the gripper module being releasably connected to the gripper module carrier, wherein the gripper system further includes a locking device for locking the gripper module to the gripper module carrier, and wherein the locking device is movable into a locking position for locking the gripper module to the gripper module carrier.

14 Claims, 5 Drawing Sheets

Figure 1:
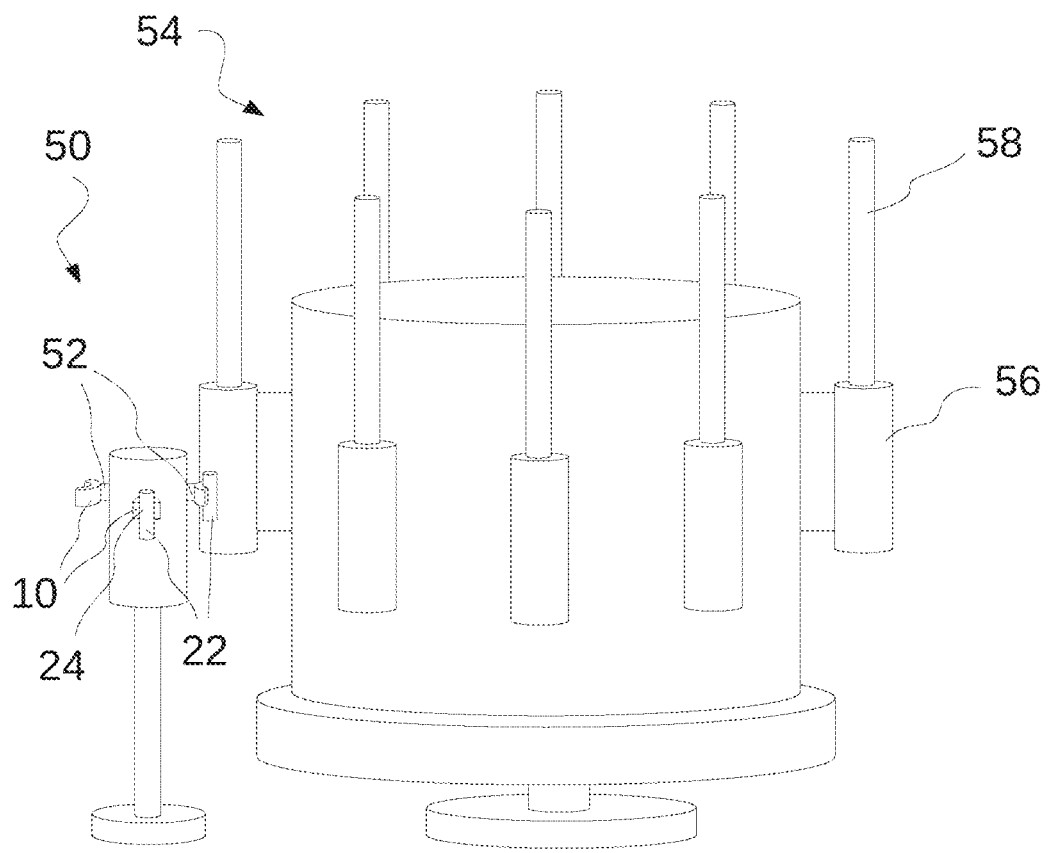

(51) Int. Cl.
*B65G 47/86* (2006.01)
*B67C 3/24* (2006.01)
*B67C 7/00* (2006.01)

(52) U.S. Cl.
CPC ............ *B67C 3/242* (2013.01); *B67C 7/0053* (2013.01); *B29L 2031/712* (2013.01); *B65G 2201/0247* (2013.01)

(58) Field of Classification Search
CPC .............. B29C 49/4205; B65G 47/847; B65G 2201/0247; B67C 3/242; B67C 7/0053; B29L 2031/712
See application file for complete search history.

(56) References Cited

U.S. PATENT DOCUMENTS

| | | | |
|---|---|---|---|
| 2010/0013253 A1 | 1/2010 | Winzinger et al. | |
| 2010/0151069 A1* | 6/2010 | Ng | B29C 49/42122 425/150 |
| 2011/0064555 A1* | 3/2011 | Stoiber | B65G 47/847 414/751.1 |
| 2011/0089003 A1 | 4/2011 | Fahldieck | |

FOREIGN PATENT DOCUMENTS

| | | | | |
|---|---|---|---|---|
| EP | 2295352 B1 * | 5/2016 | ........... | B65G 47/847 |
| FR | 2720679 A1 | 12/1995 | | |
| WO | 2008106922 A1 | 9/2008 | | |
| WO | WO-2008106922 A1 * | 9/2008 | ......... | B29C 49/4205 |
| WO | WO-2009024715 A2 * | 2/2009 | ............. | B65G 47/71 |
| WO | WO-2009060255 A1 * | 5/2009 | ............. | B65G 29/00 |

\* cited by examiner

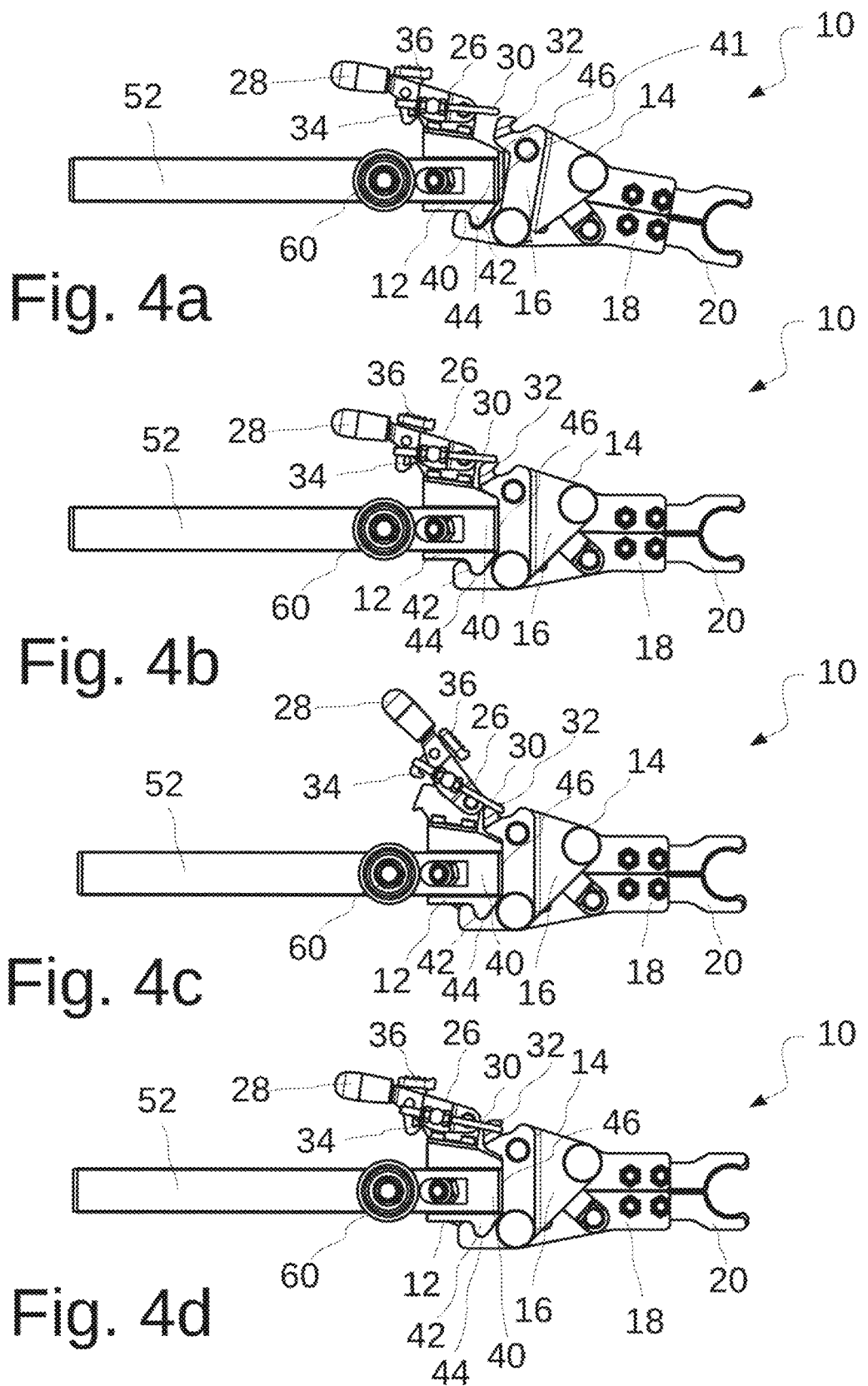

GRIPPER SYSTEM COMPRISING A GRIPPER MODULE CARRIER AND A GRIPPER MODULE FOR HOLDING WORKPIECES

The invention relates to a gripper system comprising a gripper module carrier and a gripper module for holding workpieces.

Containers, especially plastic containers, can be produced by blow molding or hydraulic molding. Rotary machines are used to produce massive quantities. In this process, a plurality of plastic preforms are successively transferred to a plurality of forming devices which are connected to a rotor section of the rotary machine, e.g., a blowing wheel or a filling wheel. Grippers may grip or provide the containers or preforms to transfer the preforms to the rotary machine or to remove the containers from the rotary machine. The grippers grip the containers or preforms in their neck area.

From EP 2 114 804 B1, a device for blow molding of containers with a handling element for holding preforms or containers is known, wherein the handling element is designed in a gripper-like manner and comprises two gripper arms. For this purpose, a one-piece construction of the gripper-like holding element is provided, which is attached by a spring tongue to a base element arranged on a supporting arm of the rotary machine. In this regard, there is a need to provide a quick change of the handling elements, in particular when a product change is due, i.e., when products with different neck widths shall be manufactured.

Thus, the object of the invention is providing a device with which a rapid change of handling elements can be carried out.

The features of the independent claims solve the object. Advantageous embodiments are subject of the dependent claims and the following description.

A gripper system comprising a gripper module carrier and a gripper module for holding workpieces, in particular containers or container preforms, is provided, the gripper module having a gripper base and two gripper arms with gripping elements for at least partially gripping around a holding region of containers or container preforms, the gripper arms being mounted on the gripper base such that they can pivot relative to one another, the gripper module being releasably connected to the gripper module carrier, according to the invention the gripper system further comprises a locking device for locking the gripper module to the gripper module carrier, wherein the locking device is movable into a locking position for locking the gripper module to the gripper module carrier, and wherein the locking device is movable into a release position for releasing the gripper module from the locking on the gripper module carrier, wherein the locking device comprises a tension lever being pivotable into the locking position and the release position for actuating the locking device.

The invention provides a modular gripper system comprising a gripper module carrier and a gripper module. The gripper module carrier may be configured to be attached to a support arm, for example. The support arm may, for example, be part of a manufacturing device for containers. Alternatively, however, the gripper module carrier may be integrally connected to a support arm. The gripper module comprises the gripping elements to hold the workpieces in a holding region of a workpiece. The holding region may be, for example, a neck region of a container preform or a container. The neck region may be arranged above a support ring on the container or container preform, and may be formed as a notch below a thread for a screw cap. Further, the gripper module is connected to the gripper module carrier via a locking device. For this purpose, the locking device comprises a locking position and a release position. In the locking position, the locking device locks the gripper module to the gripper module carrier when the gripper module is connected to the gripper module carrier. For example, the locking device may lock a tensioning device that prestresses the gripper module to the gripper module carrier. In the release position, the locking device releases the gripper module such that the gripper module is separatable from or connectable to the gripper module carrier. The locking device can therefore be used to connect and disconnect the gripper module to and from the gripper module carrier without taking much time. Thus, a quick change of the gripper module can be carried out, so that a plurality of gripper modules can be changed in a short time in case of a product change, for example, when containers with a different neck width in the holding region shall be produced. Further, the locking device provides a connection between the gripper module and the gripper module carrier without play.

According to one example, the locking device may be movable to the locking position and the release position without tools.

This allows a user to actuate the locking device by hand. Due to the tool-free operability, the time required for fastening or releasing the gripper module and thus for changing the gripper module is further reduced.

Further, the locking device may comprise, for example, a locking mechanism which locks according to the toggle principle.

This simplifies the manual operation of the locking device, as the toggle lever principle means that little force must be applied, wherein a high level of locking safety is achieved.

According to another example, the locking device may be a tension lock.

The actuation of the locking device is thus further accelerated, since only one tension lever of the tension lock must be pivoted to transfer the locking device from the release position to the locking position or from the locking position to the release position.

In a further example, the locking device can have a first holding partner, in particular in the form of a hook, bracket or loop, which is connected to the gripper module carrier or to the gripper module in a tension-proof manner, and a second holding partner, in particular in the form of a hook, bracket or loop, which is connected to the gripper module carrier or to the gripper module carrier in a tension-proof manner and matching the first holding partner, the first holding partner and the second holding partner interacting in a form-fitting manner in the locking position to provide a tension-proof connection, and being released from one another in the release position.

With the locking device comprising the first holding partner, which can cooperate with the second holding partner, a tensioning of the gripper module to the gripper module carrier is produced in a simple manner. Further, the security of the connection between the gripper module and the gripper module carrier is increased in the locking position.

According to another example, the tension lever as well as the first holding partner may be connected to the gripper module carrier and the second holding partner may be connected to the gripper module.

For example, the gripper module carrier may comprise a tension lever with a loop as a first holding partner, wherein the gripper module in this example comprises a hook as a second holding partner. The tension lever with the loop thus remains on the gripper module carrier when the gripper module is removed from the gripper module carrier. The gripper module thus comprises only the hook, which can be formed simply and relatively inexpensively. The tension lever, which is cost-intensive in comparison, thus does not have to be arranged on each gripper module, wherein, for example, in the case of differently formed holding regions, the number of gripper modules can be significantly greater than the number of gripper module carriers, for example due to different neck widths of the workpieces. The number of cost-intensive tension levers is thus limited to the number of gripper module carriers, of which there are usually significantly fewer than gripper modules on a corresponding manufacturing device. However, it should not be excluded that the hook is attached to the gripper module carrier and the tension lever with the loop is attached to the gripper module.

According to a further example, the locking device may comprise a latching element that is movable into a latching position and into an unlatching position, wherein, in the latching position, the latching element locks the locking device in the locking position and, in the unlatching position, unlocks the locking device, so that the locking device is movable from the locking position into the release position.

The locking device can therefore be locked and thus secured in the locking position by the latching element. Before the locking device can be moved from the locking position to the release position, the latching element must first be transferred from the latching position to the unlatching position. This avoids accidental movement of the locking device into the release position. This increases the security of the fastening between the gripper module and the gripper module carrier.

Thereto, the latching member may include, for example, a thumb lever for moving the latching member between the latching position and the unlatching position.

The thumb lever allows a user to easily move the latching element between the latching position and the unlatching position with a single hand. This simplifies handling and requires only a small amount of time to move the latching element between the unlatching position and the unlatching position.

Further, a gripper system comprising a gripper module carrier held by a carrier arm and a gripper module for holding workpieces, in particular containers or container preforms, is provide, the gripper module having a gripper base and two gripper arms with gripping elements for at least partially gripping around a holding region of containers or container preforms, the gripper arms being mounted on the gripper base such that they can pivot relative to one another, the gripper module being releasably connected to the gripper module carrier, according to the invention, the gripper system further comprises a locking device for locking the gripper module to the gripper module carrier, wherein the locking device is movable into a locking position for locking the gripper module to the gripper module carrier, and wherein the locking device is movable into a release position for releasing the gripper module from the locking on the gripper module carrier, wherein the locking device comprises a detent pin being movable into the locking position and the release position for actuating the locking device.

The detent pin provides a gripper system with which a quick change of the gripper module on the gripper module carrier can be carried out in a simple manner. To separate the gripper module from the gripper module carrier, it is sufficient to move the detent pin to the release position. This releases the gripper module and allows to separate it from the gripper module carrier. To connect the gripper module, it can be connected to the gripper module carrier when the detent pin is moved to the release position. To lock the connection between the gripper module and the gripper module carrier, the detent pin is moved to the locking position.

According to an example, the detent pin may be displaceably mounted on the gripper module carrier or the gripper module and may extend into a bore disposed on the gripper module or the gripper module carrier in the locking position to lock the gripper module to the gripper module carrier in a form-fitting manner.

This provides a locking device that is easy to manufacture and operate.

Further, for example, the locking device may include a spring element that forces the detent pin into the locking position under spring bias.

The detent pin can be spring-biased, for example. Due to the bias, the detent pin is forced into the locking position when the detent pin is not in the locking position and no external forces prevent it from doing so. A user may cause an external force to move the detent pin to the release position against the spring bias, and thereafter connect the gripper module to the gripper module carrier. After connecting the gripper module to the gripper module carrier, the user can release the detent pin so that the spring bias automatically moves the detent pin to the locking position. This requires only a small amount of time to release the gripper module from the gripper module carrier or to connect it to the gripper module carrier.

According to another example, the gripper system may comprise at least one positioning device for aligning the gripper module to the gripper module carrier.

An alignment of the gripper module simplifies the use of a transport device for containers or container preforms, as the gripper module has a defined position to which a container or container preform can be transferred or removed. This increases the maximum possible speed for operation of the transport device since an adjustment is minimized when transferring the containers or container preforms.

Further, in another example, the positioning device may include at least one protrusion and at least one recess configured to mate with the at least one protrusion for receiving the protrusion, the protrusion being attached to the gripper module carrier or the gripper module, wherein the recess is disposed on the gripper module or the gripper module carrier.

This provides a positioning device that is simple to manufacture and easy to use.

According to another example, the at least one positioning device may further comprise a centering element for centering the gripper module on the gripper module carrier.

Thus, the position of the gripper module on the gripper module carrier can be determined by the centering element. Thereby, a positioning of the gripper module is caused particularly in vertical direction, so that all gripper modules of a transport device are arranged in a common, preferably horizontal, plane. With the correct position of the gripper module on the gripper module carrier, the gripper module can at the same time be arranged in such a way that the locking device can be operated correctly.

In one example, the positioning device may include corresponding abutment/sliding regions that effect a positively guided positioning of the gripper module on the gripper module carrier to reach the predefined connection position in which the locking device may engage.

For example, the centering element may include at least one protrusion on the gripper module carrier and at least one recess formed on the gripper module to match the at least one protrusion for receiving the protrusion.

The protrusion in combination with the recess provides a centering element that is easy to fabricate, the centering element effectively centering the gripper module to the gripper module carrier.

Further, the centering element may have a dual function. In a first function, the centering element may function as a stop for a support arm to effect positioning of the gripper carrier module on a support arm of a transport device for a container or container preform. In a second function, the centering element may cause a centering of the gripper module on the gripper carrier module by requiring the gripper module to be arranged with the recess such that the centering means can be inserted into the recess. The recess may be formed as a keyway which must be aligned to fit the centering element to connect the gripper module to the gripper module carrier.

For example, the protrusion may be a nose and the gripper module may include a retainer for receiving at least a portion of the gripper module carrier, the recess being disposed in the retainer.

For example, a nose may be understood to be a protrusion that extends away from the gripper carrier module with a curved outer interface. The play between the gripper module and the gripper module carrier is thus further reduced.

In another example, the protrusion may be a guide rail and the retainer may be movable along the guide rail.

The guide rail may be used to provide a guided motion for connecting the gripper module and the gripper module carrier. This can further facilitate the handling of the gripper system.

Furthermore, the centering element can be designed as a spring plate that brings the gripper module into a predefined position via a spring force.

Further, in the locking position, for example, the centering element may extend in a direction parallel to the gripper arms between the gripper module carrier and the gripper module.

In this example, the centering element may be, for example, a spike on the gripper module carrier that extends into a recess in the gripper module when the gripper module is connected to the gripper module carrier. In this example, the centering element extends along a line extending between the gripper arms and the gripper module carrier in the locking position. This provides secure retention of the gripper module to the gripper module carrier and ease of centering.

The invention further relates to a transport device a container or preform, the device comprising a plurality of support arms and a plurality of gripper systems according to any one of the preceding claims, wherein it is provided that each support arm is connected to a gripper module carrier.

Advantages and effects as well as further embodiments of the device result from the advantages and effects as well as further embodiments of the gripper system described above. In this respect it is referred to the preceding description.

Figure 2:
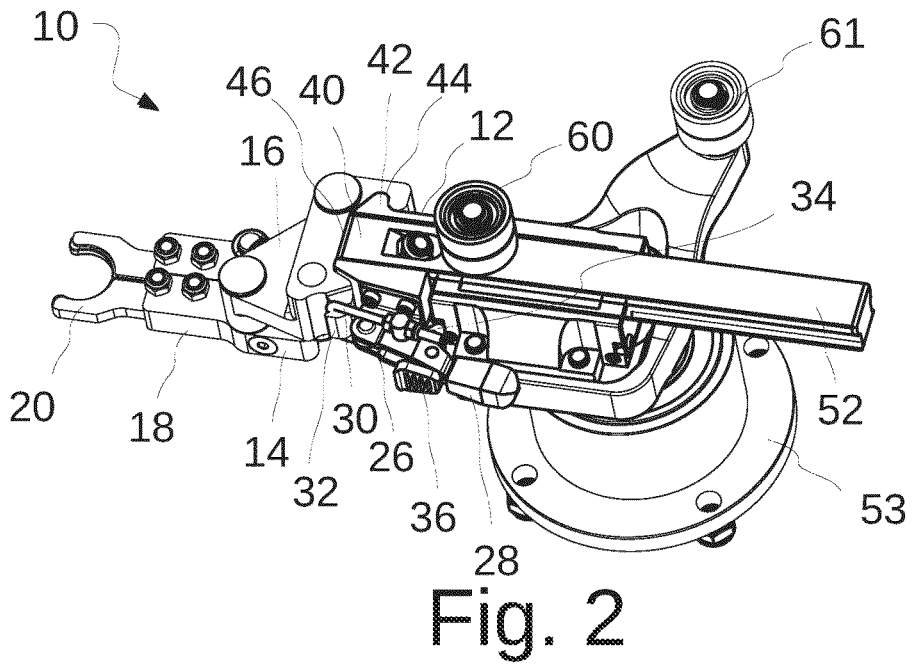
Figure 3A:
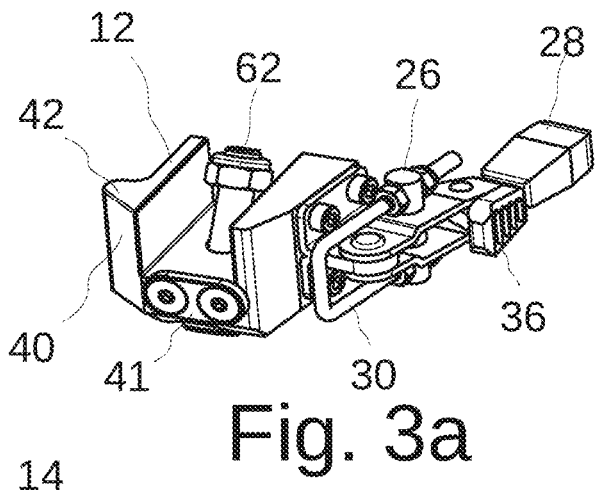
Figure 5A:
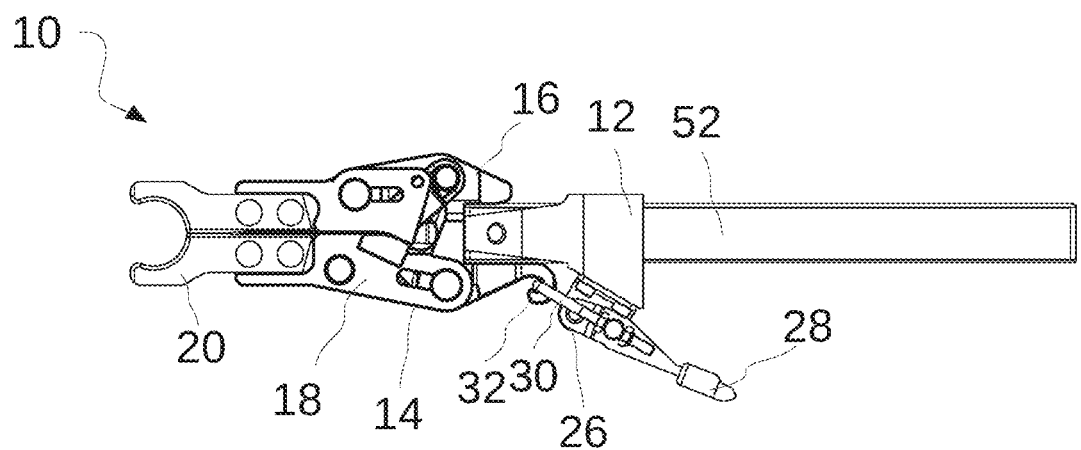
Figure 6A:
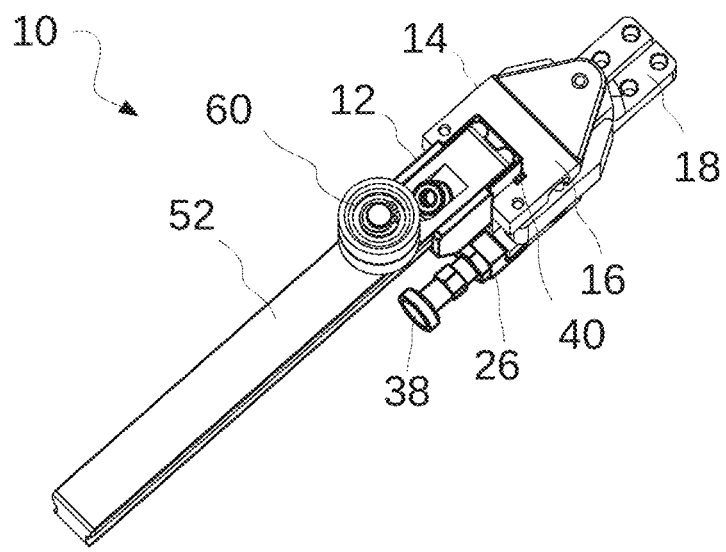

In the following, the invention will be described with reference to an exemplary embodiment with the accompanying drawing. It shows:

FIG. 1 a schematic representation of a transporting or producing device for a container or preform, FIG. 2 a schematic representation of the gripper system, FIG. 3a, b a schematic representation of the modules of the gripper system, FIG. 4a-d schematic representation of an example of the gripper system, FIG. 5a, b a schematic representation of a first further example of the gripper system, and FIG. 6a, b a schematic representation of a second further example of the gripper system.

FIG. 1 shows a transport device 50 for containers or container preforms, which may be part of a manufacturing device 54 for containers from container preforms.

In this example, the workpieces 22 are container preforms for making containers, which are transported and transferred from the transport device 50 to the manufacturing device 54. For transport, the transport device 50 comprises a plurality of support arms 52. A gripper system 10 is connected to each of the support arms 52, the gripper system 10 in this example being connected to the support arms 52 at an end portion of the support arms 52 facing away from the transport device 50. The gripper system 10 grips the workpieces 22 in a neck region 24 of the workpieces 22.

The gripper systems 10 may be separate from the support arms 52 or may be integrally connected to the support arms 52.

FIG. 2 illustrates a gripper system 10 comprising a gripper module carrier 12 and a gripper module 14. The gripper module carrier 12 is connected to the gripper module 14 via a locking device 26. The gripper module carrier 12 is attached to one of the support arms 52. In this example, the gripper module carrier 12 is disposed on the end portion of the support arm 52 that, when installed, faces away from the transport device 50.

The gripper module 14 is connected to the gripper module carrier 12. The gripper module 14 comprises gripper arms 18 connected to a gripper base 16. The gripper base 16 is arranged between the gripper arms 18 and the gripper module carrier 12. Further, the gripper module carrier 12 is arranged between the gripper module 14 and the support arm 52.

Gripping elements 20 are arranged on the gripper arms 18, with which a workpiece 22, in this example a container preform or container with a defined neck width, may be gripped in a holding region. The gripper arms 18 may be opened and closed in the process. During this opening or closing movement, the gripping elements 20 are also opened and closed.

The connection between the gripper module carrier 12 and the gripper module 14 is made by a locking device 26. For this, the locking device 26 comprises a hook at the gripper base 16 of the gripper module 14. The hook may be encompassed by a loop 30, which is connected to the gripper carrier module 12 via a tension lever 28. The loop and the hook form a first holding partner 30 and a second holding partner 32, which in the locking position cooperate in a form-fitting manner for establishing a tension-proof connection between the gripper module 14 and the gripper module carrier 12. The locking device 26 is thus manually operable without the use of tools. Instead of a loop, a bracket may also be provided as one of the holding partners 30, 32.

The gripper module 14 is arranged in a predefined position by a positioning device 40 when the gripper module 14 is connected to the gripper module carrier 12.

In this example, the positioning device 40 includes a protrusion 42 extending laterally away from the gripper module carrier 12. The protrusion 42 is received by a recess 44 on the gripper module 14 and horizontally centers the gripper module 14 on the gripper module carrier 12. Further, the gripper module 14 includes a retainer 46 at the gripper base 16 that receives a portion of the gripper module carrier 12 and may also be part of the positioning device 40.

The positioning device 40 further comprises a centering element 41 with a dual function, which is formed as a stop plate. In a first function, the centering element 41 provides a stop in the attachment of the gripper module carrier 12 to a support arm 52. The gripper module carrier 52 is positioned on a support arm 52 such that the support arm 52 abuts against the centering element 41.

In the second function, the centering element 41 centers the gripper module 14 when the gripper module 14 is coupled to the gripper module carrier 12. The gripper module 14 comprises a recess 43 which is formed as a keyway and can receive the centering element 41, i.e., is formed to receive the centering element 41. The recess 43 is guided over the centering element 41 when the gripper module 14 is coupled to the gripper module carrier 12. Then, the centering element 41 centers the gripper module 14.

The support arm 52 may be slidably mounted along its length on a support member 53. Further, the support arm 52 may comprise rollers 60 and 61 that may cooperate with a cam control of the transport device 50. With the roller 60, the support arm 52 can be displaced along its longitudinal extension by a cam control. This simultaneously causes the gripper system 10 to be displaced, such that the roller 60 can be used to move the gripper system 10 forwards and backwards along the longitudinal extent of the support arm 52 to support a gripping movement.

The roller 61 can be used to cause the support arm 52 and the gripper system 10 to pivot by a further cam control. The gripper system 10 can be pivoted to support a gripping movement or to avoid obstacles.

FIG. 3a shows the gripper module carrier 12 in more detail. The gripper module carrier 12 comprises a fastening element 62, with which the gripper module carrier 12 can be connected to the support arm 52. A part of the locking device 26 is arranged on a side surface of the gripper module carrier 12.

The locking device 26 comprises a tension lever 28, which is pivotably connected to the gripper module carrier 12. The tension lever 28 and the locking device 26 can be moved between a locking position and a release position.

Further shown is a thumb lever 36 on the tension lever 28. The thumb lever 36 is for single-handedly actuating a latching element 34 for latching the tension lever 28 in the locking position. In this regard, the latching element 34 has a latching position for locking the locking device 26 in the locking position. In an unlatching position, the latching element 34 unlatches the locking device 26 when the locking device 26 is in the locking position.

Further, the locking device 26 includes a loop as a first holding partner 30 that is rotatably connected to the tension lever 28 about an axis of rotation.

On the opposite side to the tension lever 28, the gripper module carrier 12 includes a protrusion 42 formed as a nose extending laterally away from the gripper module carrier 12. The protrusion is part of the positioning device 40 that can be used to move the position of a gripper module 14 being connected to the gripper module carrier 12 to a predefined position.

Figure 3B:
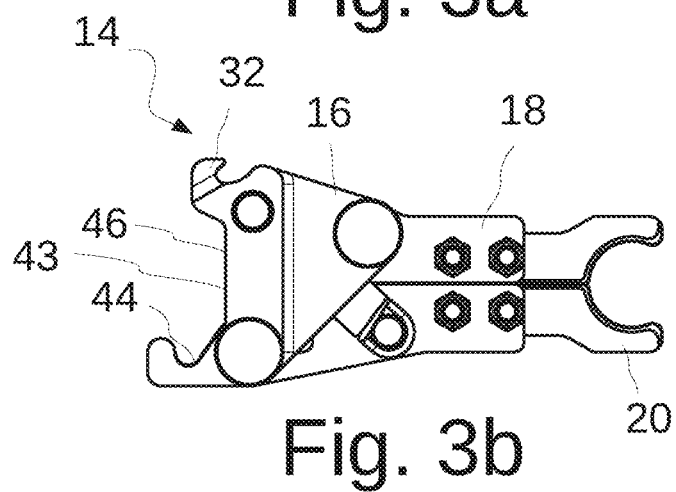

FIG. 3b shows the gripper module 14. A hook is provided at the gripper base 16 as a second holding partner 32, which can cooperate with the loop of the gripper module carrier 12. The loop can be hooked or unhooked into the hook when the gripper module 14 is connected to the gripper module carrier 12 and the locking device 26 is in the release position.

On the opposite side where the hook 32 is disposed, the gripper base 16 includes recess 44 which can receive the projection 42 of the gripper module carrier 12. Further, the gripper base 16 comprises a retainer 46 which can partially receive the gripper module carrier 12. The recess 44 may be a part of the retainer 46.

Two gripper arms 18 are pivotally connected to the gripper base 16. The gripper arms 18 further comprise gripping elements 20, wherein the gripping elements 20 of the two gripper arms 18 can cooperate to grip a holding region 24 of a workpiece 22.

FIGS. 4a to 4d show how the gripper module 14 can be connected to the gripper module carrier 12 on the example of the gripper system 10 of FIGS. 2, 3a and 3b.

According to FIG. 4a, the gripper module 14 is first tilted to approach the gripper module carrier 12 with the recess 44 arranged over the projection 42. The end of the gripper base 16 is spaced apart from the locking device 26, the end being arranged on the other side of the support arm 52 and comprising the hook 32.

The gripper module 14 is pivoted towards the support arm 52 with the end of the gripper base 16 where the hook 32 is located. This is shown in FIG. 4b. Then, the hook is in contact with the loop. In this position, or even before, the thumb lever 36 is actuated to move the latching element 34 from the latching position to the unlatching position. The latching in the latching position is achieved by a further hook which is connected to the thumb lever, and which is hooked to the locking device 26. Actuation of the thumb lever 36 unhooks that hook. When the latching element 34 is in the unlatched position, the tension lever 28 can be pivoted.

FIG. 4c shows the pivoted tension lever 28. In that position the loop can be hooked. When returning the tension lever 28 to the locking position, the loop pulls the hook to the locking device 26 such that the gripper module 14 is pressed against the gripper module carrier 12. This causes a tensioning of the gripper module 14 against the gripper module carrier 12.

FIG. 4d shows that the latching element 34 is moved back into the latching position as soon as the tension lever 28 is in the locking position. The gripper module 14 can thus be attached to the gripper module carrier 12 without play or detached from the gripper module carrier in less than 15 seconds.

To release the gripper module 14 from the gripper module carrier 12, the procedure is reversed. First, the thumb lever 36 is actuated to move the latching element 34 to the unlatched position. Then, the tension lever 28 can be pivoted to move the locking device 26 to the release position such that the loop can be unhooked from the hook. Thereupon, the gripper module 14 is pivoted with the hook away from the loop, with the gripper module 14 continuing to remain in contact with the gripper module carrier 12 at the position of the recess 44. After pivoting the gripper module 14, the gripper module 14 may also be separated from the gripper module carrier 12 at the position of the recess 44.

Figure 5B:
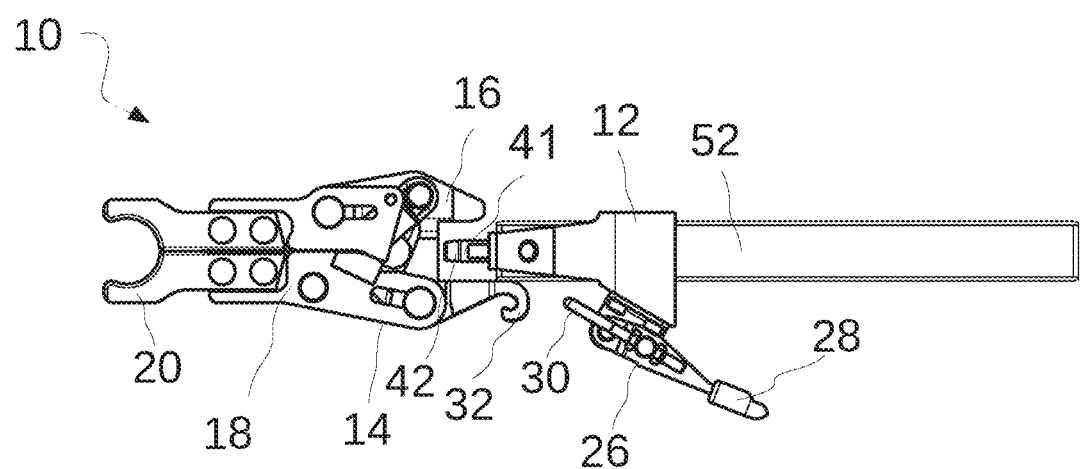

FIGS. 5a and 5b show an alternative embodiment of the gripper system 10. In this embodiment, reference signs of the previously described embodiment denote identical components.

In contrast to the exemplary embodiment explained in the previous description, the exemplary embodiment according to FIGS. 5a and 5b does not comprise a latching element on the locking device 26. For example, the tension lever 28 can be held in position in the locking position shown in FIG. 5a by the bias acting in the locking position. The bias is created by the pull exerted by the tension lever 28 on the gripper module 14 by the loop on the hook in the locking position.

Referring to FIG. 5b, the gripper system 10 further comprises a centering element [40] 41 formed as a protrusion 42, the protrusion 42 extending along a longitudinal axis of the gripper module carrier 12. The gripper module 14 comprises a recess in the gripper base 16 that is configured to mate with the protrusion 42, such that the protrusion 42 is insertable into that recess.

To place the gripper module 14 on the gripper module carrier 12, the gripper module 14 is placed on the gripper module carrier 12 or on the support arm 52 along the direction in which the protrusion 42 extends and is tensioned by the tension lever 28.

Figure 6B:
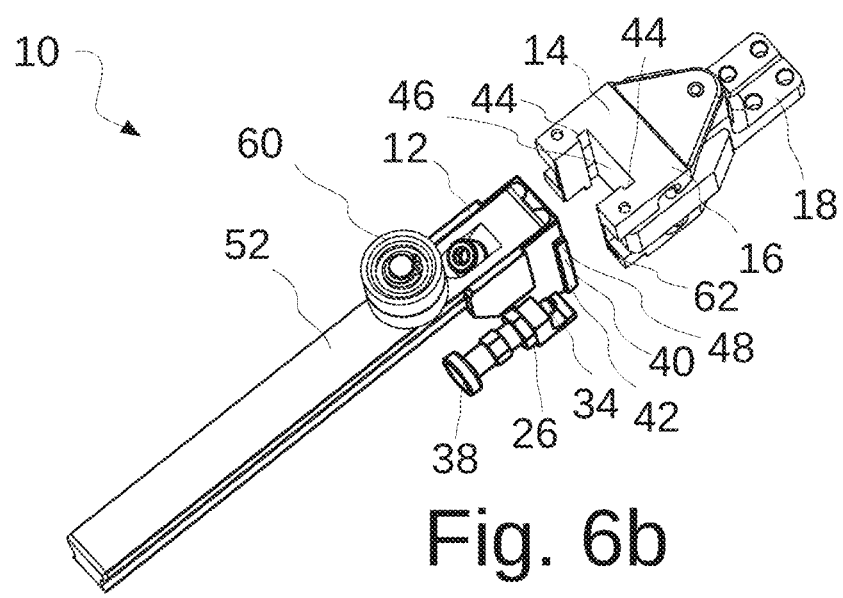

FIGS. 6a and 6b illustrate another alternative exemplary embodiment of the gripper system 10. Elements designated with the reference sign from the previous figures represent identical elements. FIGS. 6a and 6b do not show the gripping elements 20 which may of course be connected to the gripper arms 18 of the gripper module 14.

In contrast to the two previously explained exemplary embodiments, the exemplary embodiment of FIGS. 6a and 6b comprises a locking device 26 with a detent pin 38. FIG. 6a shows the locking position of the locking device 26. To move the locking device 26 from the locking position to the release position, the detent pin 38 can be moved away from the gripper module 14. The detent pin 38 may optionally include a spring element that pulls back the detent pin 38 into the locking position when no external forces are acting on the detent pin 38.

In FIG. 6b, the gripper module 14 and the gripper module carrier 12 are separated from each other. The centering element 41 can be seen here, which protrudes laterally from the gripper module carrier 12 as a protrusion 42. The protrusions 42 form guide rails 48. The gripper module 14 comprises a recess 44, which is formed to match the guide rails 48. The recesses 44 are configured to be moved along the guide rails 48.

Further, the gripper module 14 includes a bore 62 formed to mate with an end portion of the detent pin 38. The bore 62 can receive the end portion of the detent pin 38.

To connect the gripper module 14 to the gripper module carrier 12, the gripper module 14 is arranged with the recesses 44 over the guide rails 48. The gripper module 14 and the gripper module carrier 12 are initially arranged laterally offset from each other. The gripper module 14 is then moved with the recesses 44 along the guide rails 48 until the guide 62 is aligned with the detent pin 38. To effect this, the detent pin 38 may first be moved to the release position. Once the bore 62 is aligned with the detent pin 38, the detent pin 38 is moved to the locking position. In the locking position, the detent pin 38 locks the locking device 26 in the locking position with its end portion acting as a latching element 34.

LIST OF REFERENCE SIGNS

10 Gripper system
12 Gripper module support
14 Gripper module
16 Gripper base
18 Gripper arm
20 Gripping element
22 Workpiece
24 Neck area
26 Tensioning device
28 Tension lever
30 Loop element
32 Hook element
34 Latching element
36 Thumb lever
38 Detent pin
40 Positioning device
41 Centering element
42 Protrusion
43 Recess
44 Recess
46 Retainer
48 Guide rail
50 Transport device
52 Support arm
53 Holding element
54 Manufacturing device
56 Forming device
58 Stretch element
60 Roller
61 Roller
62 Bore

The invention claimed is:

1. Gripper system comprising a gripper module carrier (12) and a gripper module (14) for holding workpieces (22), in particular containers or container preforms, the gripper module (14) having a gripper base (16) and two gripper arms (18) with gripping elements (20) for at least partially gripping around a holding region (24) of containers or container preforms, the gripper arms being mounted on the gripper base (16) such that they can pivot relative to one another, the gripper module (14) being releasably connected to the gripper module carrier (12), characterized that the gripper system (10) further comprises a locking device (26) for locking the gripper module (14) to the gripper module carrier (12), wherein the locking device (26) is movable into a locking position for locking the gripper module (14) to the gripper module carrier (12), and wherein the locking device (26) is movable into a release position for releasing the gripper module (14) from the locking on the gripper module carrier (12), wherein the locking device (26) comprises a tension lever (28) being pivotable into the locking position and the release position for actuating the locking device (26), wherein the tension lever is part of, and remains on the gripper module carrier, when the gripper module is removed from the gripper module carrier.

2. Gripper system according to claim 1, characterized in that the locking device (26) is movable into the locking position and into the release position without tools.

3. Gripper system according to claim 1, characterized in that the locking device comprises a locking mechanism which locks according to the toggle principle.

4. Gripper system according to claim 1, characterized in that the locking device (26) may be a tension lock.

5. Gripper system according to claim 1, characterized in that the locking device has a first holding partner (30), in particular in the form of a hook, bracket or loop, and a second holding partner (32), in particular in the form of a hook, bracket or loop, the first holding partner being connected to the gripper module carrier (12) or to the gripper module (14) in a tension-proof manner, the second holding partner being designed in a matching manner to the first holding partner (30) and being connected to the gripper module (14) or to the gripper module carrier (12) in a tension-proof manner, the first holding partner (30) and the second holding partner (32) interacting in a form-fitting manner in the locking position for providing a tension-proof connection, and being released from one another in the release position.

6. Gripper system according to claim 5, characterized in that the tension lever (28) as well as the first holding partner (30) are connected to the gripper module carrier (12), and that the second holding partner (32) is connected to the gripper module (14).

7. Gripper system according to claim 1, characterized in that the locking device (26) comprises a latching element (34) which is movable into a latching position and into an unlatching position, wherein, in the latching position, the latching element (34) latches the locking device (26) in the locking position and, in the unlatching position, unlocks the locking device (26), such that the locking device (26) is movable from the locking position into the release position.

8. Gripper system of claim 7, characterized in that the latching member (34) comprises a thumb lever (36) for moving the latching member between the latching position and the unlatching position.

9. Gripper system comprising a gripper module carrier (12) held by a carrier arm (52) and a gripper module (14) for holding workpieces (22), in particular containers or container preforms, the gripper module (14) having a gripper base (16) and two gripper arms (18) with gripping elements (20) for at least partially gripping around a holding region (24) of containers or container preforms, the gripper arms being mounted on the gripper base (16) such that they can pivot relative to one another, the gripper module (14) being releasably connected to the gripper module carrier (12),
characterized that the gripper system (10) further comprises a locking device (26) for locking the gripper module (14) to the gripper module carrier (12), wherein the locking device (26) is movable into a locking position for locking the gripper module (14) to the gripper module carrier (12), and wherein the locking device (26) is movable into a release position for releasing the gripper module (14) from the locking on the gripper module carrier (12), wherein the locking device (26) comprises a detent pin (38) being movable into the locking position and the release position for actuating the locking device (26), locking device (26) comprises a spring element which forces the detent bolt (38) into the locking position under spring-bias.

10. Gripper system according to claim 9, characterized in that the detent pin (38) is displaceably mounted on the gripper module carrier (12) or the gripper module (14) and, in the locking position, extends into a bore (62) arranged on the gripper module (14) or on the gripper module carrier (12) to lock the gripper module (14) to the gripper module carrier (12) in a form-fitting manner.

11. Gripper system according to claim 9, characterized in that the gripper system (10) comprises at least one positioning device (40) for aligning the gripper module (14) to the gripper module carrier (12).

12. Gripper system of claim 11, characterized in that the positioning device (40) comprises at least one protrusion (42) and at least one recess (44) configured to mate with the at least one protrusion (42) for receiving the protrusion, the protrusion (42) being attached to the gripper module carrier (12) or the gripper module (14), wherein the recess (44) is disposed on the gripper module (14) or the gripper module carrier (12).

13. Gripper system according to claim 11, characterized in that said at least one positioning device (40) further comprises a centering element (41) for centering said gripper module (14) on the gripper module carrier (12).

14. Transport device (50) for a container or container preform, the transport device comprising at least one gripper system (10), the gripper system comprising a gripper module carrier (12) and a gripper module (14) for holding workpieces (22), in particular containers or container preforms, the gripper module (14) having a gripper base (16) and two gripper arms (18) with gripping elements (20) for at least partially gripping around a holding region (24) of containers or container preforms, the gripper arms being mounted on the gripper base (16) such that they can pivot relative to one another, the gripper module (14) being releasably connected to the gripper module carrier (12),
characterized that the gripper system (10) further comprises a locking device (26) for locking the gripper module (14) to the gripper module carrier (12), wherein the locking device (26) is movable into a locking position for locking the gripper module (14) to the gripper module carrier (12), and wherein the locking device (26) is movable into a release position for releasing the gripper module (14) from the locking on the gripper module carrier (12), wherein the locking device (26) comprises a tension lever (28) being pivotable into the locking position and the release position for actuating the locking device (26), wherein the tension lever is part of, and remains on, the gripper module carrier, when the gripper module is removed from the gripper module carrier.

* * * * *